US009261120B2

(12) United States Patent
Colangelo et al.

(10) Patent No.: US 9,261,120 B2
(45) Date of Patent: Feb. 16, 2016

(54) CLIPS FOR COUPLING DEVICES TO SUPPORT MEMBERS EXTENDING BETWEEN STRUCTURAL MEMBERS

(71) Applicant: Illinois Tool Works Inc., Glenview, IL (US)

(72) Inventors: Tom M. Colangelo, Lombard, IL (US); Asim B. Siddiqui, Elgin, IL (US); Justin C. McMath, Chicago, IL (US); Tomasz R. Sikora, River Grove, IL (US)

(73) Assignee: ILLINOIS TOOL WORKS INC., Glenview, IL (US)

(\*) Notice: Subject to any disclaimer, the term of this patent is extended or adjusted under 35 U.S.C. 154(b) by 122 days.

(21) Appl. No.: 13/786,979

(22) Filed: Mar. 6, 2013

(65) Prior Publication Data

US 2014/0150218 A1    Jun. 5, 2014

Related U.S. Application Data

(60) Provisional application No. 61/732,178, filed on Nov. 30, 2012.

(51) Int. Cl.
*H02G 3/12* (2006.01)
*F16B 2/22* (2006.01)

(52) U.S. Cl.
CPC *F16B 2/22* (2013.01); *H02G 3/125* (2013.01); *Y10T 24/44* (2015.01); *Y10T 24/44641* (2015.01); *Y10T 24/44983* (2015.01)

(58) Field of Classification Search
USPC .............. 248/228.7, 228.6, 231.71, 231.81, 248/316.1, 316.7, 343, 342, 226.11, 228.1, 248/227.4; 174/50, 58, 64; 220/3.2, 3.3, 220/3.7, 3.9, 3.92, 3.94

See application file for complete search history.

(56) References Cited

U.S. PATENT DOCUMENTS

| 2,466,912 A | | 4/1949 | Rice | |
| 2,809,002 A | \* | 10/1957 | Rudolph | .......................... 248/57 |
| 3,104,087 A | \* | 9/1963 | Budnick et al. | ................ 248/343 |

(Continued)

FOREIGN PATENT DOCUMENTS

GB        5732766 A  \*  4/1969 ................ F16B 2/20

OTHER PUBLICATIONS

Erico International, Caddy Glider Electrical Box Attachment, Product No. TSGLDR1, published at least as early as Nov. 29, 2011.

(Continued)

*Primary Examiner* — Alfred J Wujciak
(74) *Attorney, Agent, or Firm* — Klintworth & Rozenblat IP LLC

(57) ABSTRACT

Clips for coupling devices, such as electrical junction boxes, to support members are provided. In one example, a clip for coupling an electrical junction box to a support member includes a coupling member and a flange. The coupling member is adapted to engage the support member and includes a first member, a second member spaced-apart from the first member, and a third member extending between and engaging the first and second members. The first, second and third members together define a receptacle adapted to receive the support member therein. The flange extends from the coupling member and defines a fastener opening therein adapted to receive a fastener for coupling the clip to the electrical junction box.

16 Claims, 10 Drawing Sheets

(56) References Cited

U.S. PATENT DOCUMENTS

| | | | |
|---|---|---|---|
| 3,131,447 A * | 5/1964 | Tinnerman | 248/231.81 |
| 3,214,126 A * | 10/1965 | Roos | 248/318 |
| 4,460,139 A | 7/1984 | Bochen et al. | |
| 4,623,102 A | 11/1986 | Hough, Jr. | |
| 5,036,949 A * | 8/1991 | Crocker et al. | 182/3 |
| 5,044,582 A * | 9/1991 | Walters | 248/57 |
| 5,141,185 A | 8/1992 | Rumbold et al. | |
| 5,209,444 A | 5/1993 | Rinderer | |
| 5,386,959 A | 2/1995 | Laughlin et al. | |
| 5,624,202 A * | 4/1997 | Grierson | 403/327 |
| 6,032,306 A | 3/2000 | Gummin | |
| 6,389,658 B1 | 5/2002 | Pfaller et al. | |
| 6,595,479 B2 * | 7/2003 | Johnson et al. | 248/343 |
| 6,761,341 B2 | 7/2004 | Pfaller | |
| 7,472,875 B2 * | 1/2009 | Rinderer | 248/200.1 |
| 7,857,275 B2 * | 12/2010 | de la Borbolla | 248/342 |
| 8,297,579 B1 * | 10/2012 | Gretz | 248/343 |
| 8,403,277 B2 * | 3/2013 | Nuernberger et al. | 248/200.1 |
| 8,857,771 B2 * | 10/2014 | Streetman | 248/72 |
| 2006/0237601 A1 * | 10/2006 | Rinderer | 248/200.1 |
| 2008/0142646 A1 | 6/2008 | Magno et al. | |

OTHER PUBLICATIONS

Cooper B-Line, Telescoping Box Mounting Bracket, Product Nos. BB2-16T and BB2-24T, published at least as early as Nov. 29, 2011.

Cooper B-Line, Telescoping Slider Bracket, Product Nos. BB216TS, BB224TS and BB2TS, published at least as early as Nov. 29, 2011.

Cooper B-Line, Croc-Lok Box Mounting Bracket, Product Nos. BB2CL, BB216TCL and BB224TCL, published at least as early as Nov. 29, 2011.

Ramset Gas Tool Fastener, Ceiling clip assembly, Part No. 34CLIP, published at least as early as Nov. 29, 2011.

Ramset Gas Tool Fastener, Bridle ring, Part No. BR2, published at least as early as Nov. 29, 2011.

www.showmecables.com, J-Hook with beam clamp cable support, Part No. JHK-21-DC, published at least as early as Nov. 29, 2012.

* cited by examiner

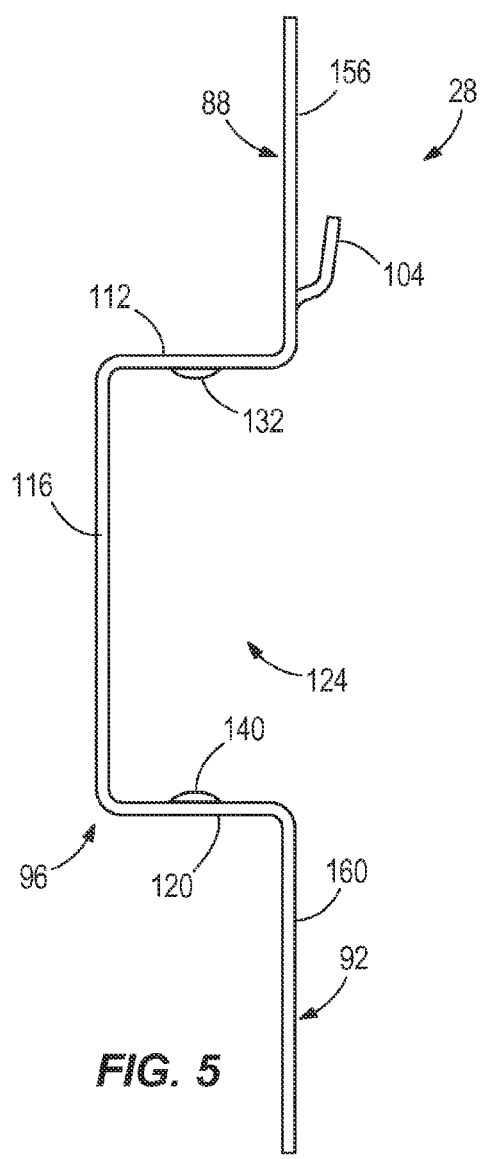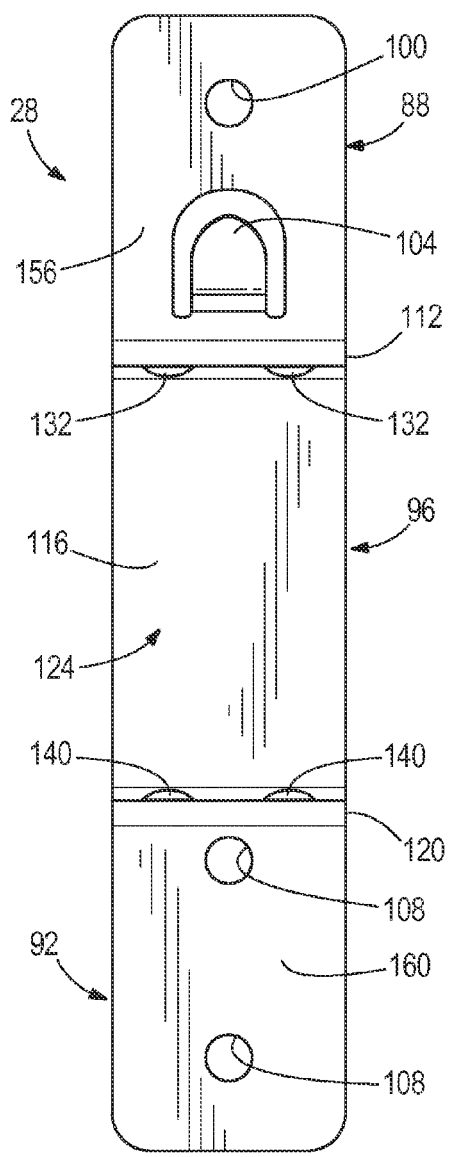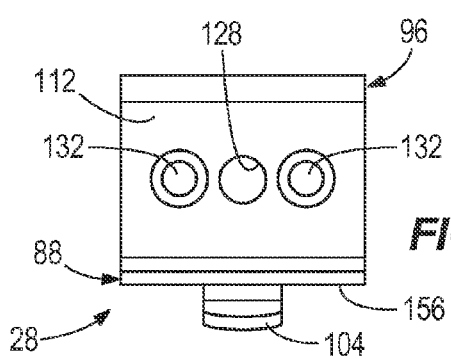

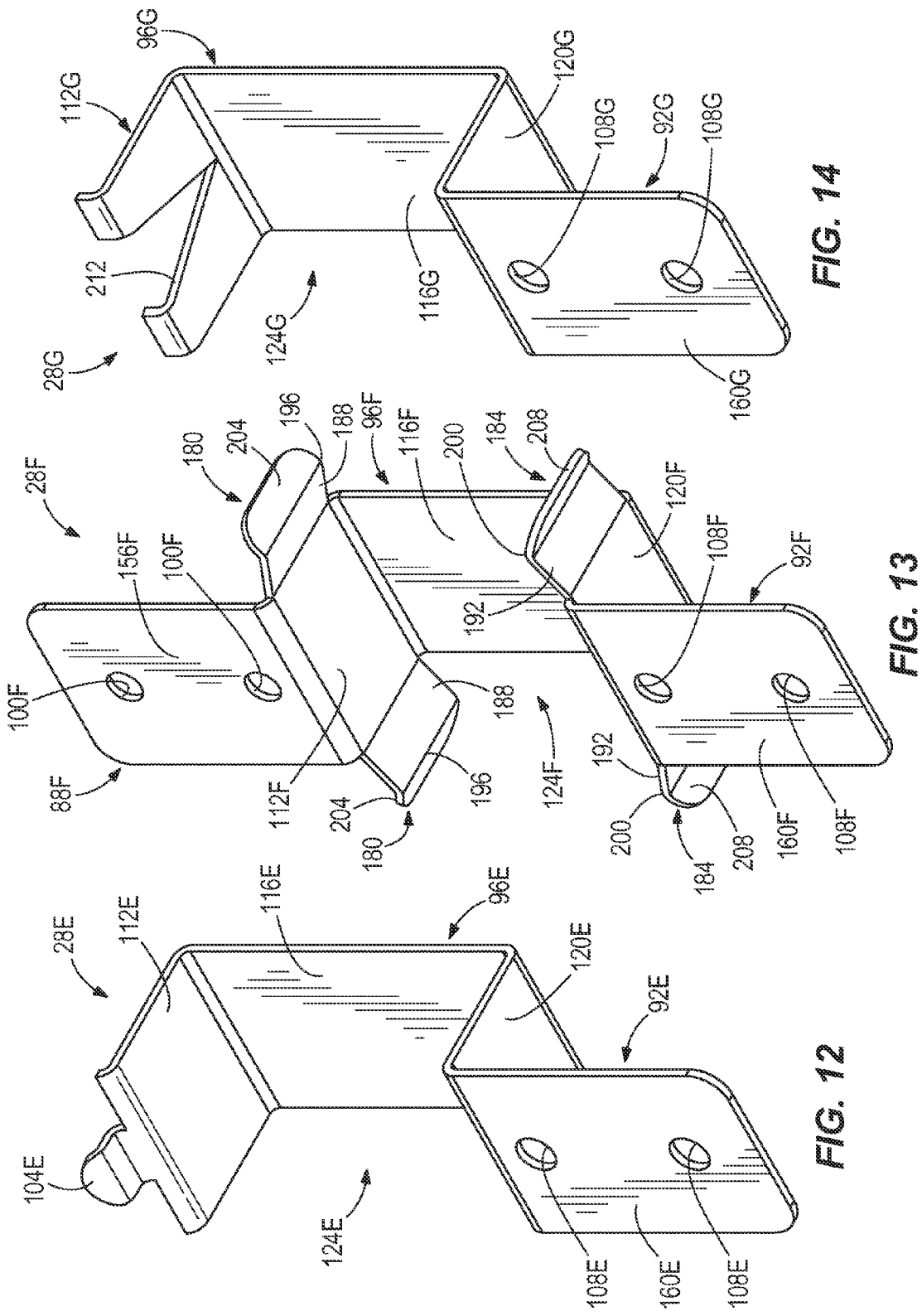

CLIPS FOR COUPLING DEVICES TO SUPPORT MEMBERS EXTENDING BETWEEN STRUCTURAL MEMBERS

RELATED APPLICATIONS

The present application claims the benefit of co-pending U.S. Provisional Patent Application No. 61/732,178, filed Nov. 30, 2012, the entire contents of which are incorporated herein by reference.

FIELD OF THE INVENTION

The present disclosure generally relates to clips for coupling devices to support members extending between vertical structural members associated with and, more particularly, to clips for coupling electrical junction boxes to support members extending between vertical structural members associated with building structures.

BACKGROUND

Many devices, structures, and accessories are located in a structural wall and have a variety of different functions. One such device is an electrical junction box. Electrical junction boxes are used to house and protect electrical devices such as electrical outlets, switches and associated wiring when the electrical devices are installed in a building or other structure. Typically, an electrical device is installed either by securing the junction box containing the electrical device directly to framing within the structure, or by securing the junction box to a support member or mounting device that is fastened to such framing. The mounting device comprises a mounting bar having coupling flaps at opposite ends of the bar for securement to spaced-apart wall studs or structural members. When the coupling flaps are secured to the studs, the mounting bar extends generally horizontally between the studs. The mounting bar has a generally channel-shaped cross-section, and a plurality of box mounting openings are defined in and spaced along the length of the mounting bar for receiving fasteners to secure an electrical junction box to the mounting bar at a selected location.

To attach an electrical junction box to mounting devices of the type described above, fasteners are typically inserted through openings in the rear wall of the electrical junction box into selected openings in the mounting device to attach the electrical junction box directly to the mounting device. In the case of the mounting bar described above, the particular openings selected will depend on the desired position of the electrical junction box relative to the framing of the building. The procedure is typically carried out at the job site when the junction box is empty (before installation of an electrical device in the junction box) so that the installer has uninhibited access to the electrical junction box and there is no risk of damage to the contents of the electrical junction box. After the electrical junction box is fastened to the mounting device, the electrical device is installed in the electrical junction box and wired.

The above procedure cannot be used if the box is "pre-wired", that is, if the electrical device is installed in the electrical junction box at a location other than the job site. In this situation, the empty electrical junction box must be secured to the appropriate mounting device at a remote location, the electrical device wired in the electrical junction box, and the "pre-wired" box then transported to the installation site. However, a problem arises if there is a need to adjust the position of the electrical junction box on the mounting device at the job site, since any such adjustment would require the installer to remove the electrical device from the electrical junction box, reposition the electrical junction box on the mounting device, and then replace the electrical device in the electrical junction box, or some other time-consuming and expensive procedure.

Similarly, the conventional procedure is unsatisfactory if the electrical junction box and associated mounting device are pre-assembled (referred to as a pre-assembled electrical junction box assembly). A pre-assembled electrical junction box assembly is an electrical junction box (and optionally, but not necessarily an electrical device) that is mounted on the mounting device at a location other than the job site. Like with a pre-wired electrical device, because the electrical junction box of a pre-assembled junction box assembly is already secured to the mounting device being shipped, a problem arises if there is a need to adjust the position of the electrical junction box on the mounting device at the job site. In effect, the electrical junction box would have to be removed from the mounting device, and any assembled components may have to be disassembled, thereby negating any advantage of pre-assembly.

Moreover, brackets or other intermediary components may be introduced between the electrical junction box and the mounting device in order to couple the electrical junction box to the mounting device. For example, brackets may be coupled to the mounting device and electrical junction boxes may be coupled to the brackets. Some of these brackets are extremely wide (in some cases as wide as or wider than the electrical junction box) and consume a large amount of the space along the mounting device. This wide footprint limits the flexibility and quantity of mounting locations along the mounting device between the wall studs. Additionally, the wide footprint inhibits the electrical junction box from being positioned close to one of the wall studs. Furthermore, consuming a large quantity of space between the wall studs inhibits coupling additional brackets and additional electrical junction boxes to the same mounting device between the wall studs. Conventional brackets or other intermediary component are large in size and, therefore, require a large amount of material to make the bracket. This results in such brackets being expensive to manufacture and expensive to consumers.

Conventional brackets or other intermediary components often include complicated configurations having a variety of bends, recesses, and other shapes requiring complicated manufacturing processes. Such complicated manufacturing processes can add additional cost to the brackets.

Furthermore, conventional brackets or other intermediary components wrap completely around the mounting device, thereby positioning a portion thereof between a front of the mounting device and a rear wall of the electrical junction box. Positioning the bracket between the mounting device and the electrical junction box spaces the electrical junction box out in front of the mounting device. Thus, the rear of the electrical box cannot be brought into close proximity with a front of the mounting device.

SUMMARY

The present disclosure is defined by the following claims, and nothing in this section should be taken as a limitation on those claims.

In one aspect, a clip for coupling a device to a support member is provided and includes a coupling member and a flange. The coupling member is adapted to engage the support member and includes a first member, a second member spaced-apart from the first member, and a third member extending between and engaging the first and second members. The first, second and third members together define a receptacle adapted to receive the support member therein. The flange extends from the coupling member and defines a fastener opening therein adapted to receive a fastener for coupling the clip to the device.

In another aspect, a clip for coupling a device to a support member is provided and includes a coupling member and a flange. The coupling member is adapted to wrap around a portion of the support member and the coupling member includes a portion adapted to insert into a channel defined in the support member. The flange extends from the coupling member and includes a first projection adapted to insert into an opening defined in the device and a second projection adapted to engage a rear surface of the device.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 5 is a right side view of the clip shown in FIG. 3, in accordance with one embodiment.

FIG. 6 is a front view of the clip shown in FIG. 3, in accordance with one embodiment.

FIG. 7 is a top view of the clip shown in FIG. 3, in accordance with one embodiment.

FIG. 12 is a bottom, front isometric view of still another exemplary clip for supporting and coupling a device, such as an electrical junction box, to a support member, in accordance with one embodiment.

FIG. 13 is a bottom, front isometric view of still a further exemplary clip for supporting and coupling a device, such as an electrical junction box, to a support member, in accordance with one embodiment.

FIG. 14 is a bottom, front isometric view of another exemplary clip for supporting and coupling a device, such as an electrical junction box, to a support member, in accordance with one embodiment.

DETAILED DESCRIPTION

Clips and methods are disclosed herein for coupling devices, structures, and accessories to support members extending between vertical structural members used in walls of structures or buildings. For example, such devices structures, and accessories may include, but are not limited to, electrical junction boxes of all shapes (e.g., square, rectangular, etc.), flexible or rigid conduit containing electrical cables or other wires, plumbing pipes, etc. The following description and the associated figures include an electrical junction box as the exemplary device coupled to a support member with the clips. The electrical junction box is used for exemplary purposes and is only one of many types of devices, structures and accessories that may be coupled to support members by clips, and the use of the electrical junction box is not intended to be limiting.

Figure 1:
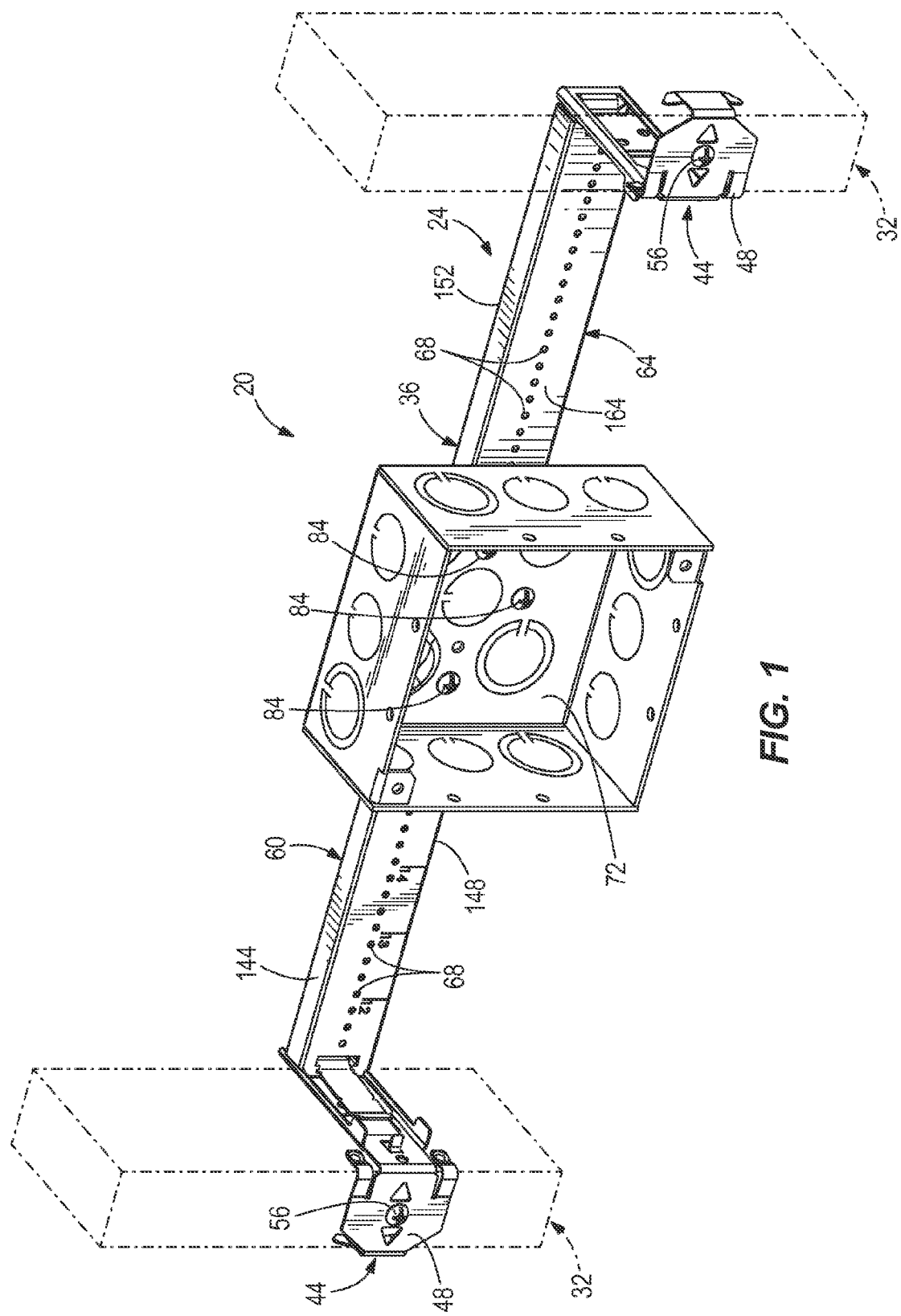
FIG. 1 is a top, front isometric view of an exemplary telescoping support member, an exemplary device such as an electrical junction box, and an exemplary clip for supporting and coupling the device, such as the electrical junction box, to the support member, in accordance with one embodiment.
Figure 2:
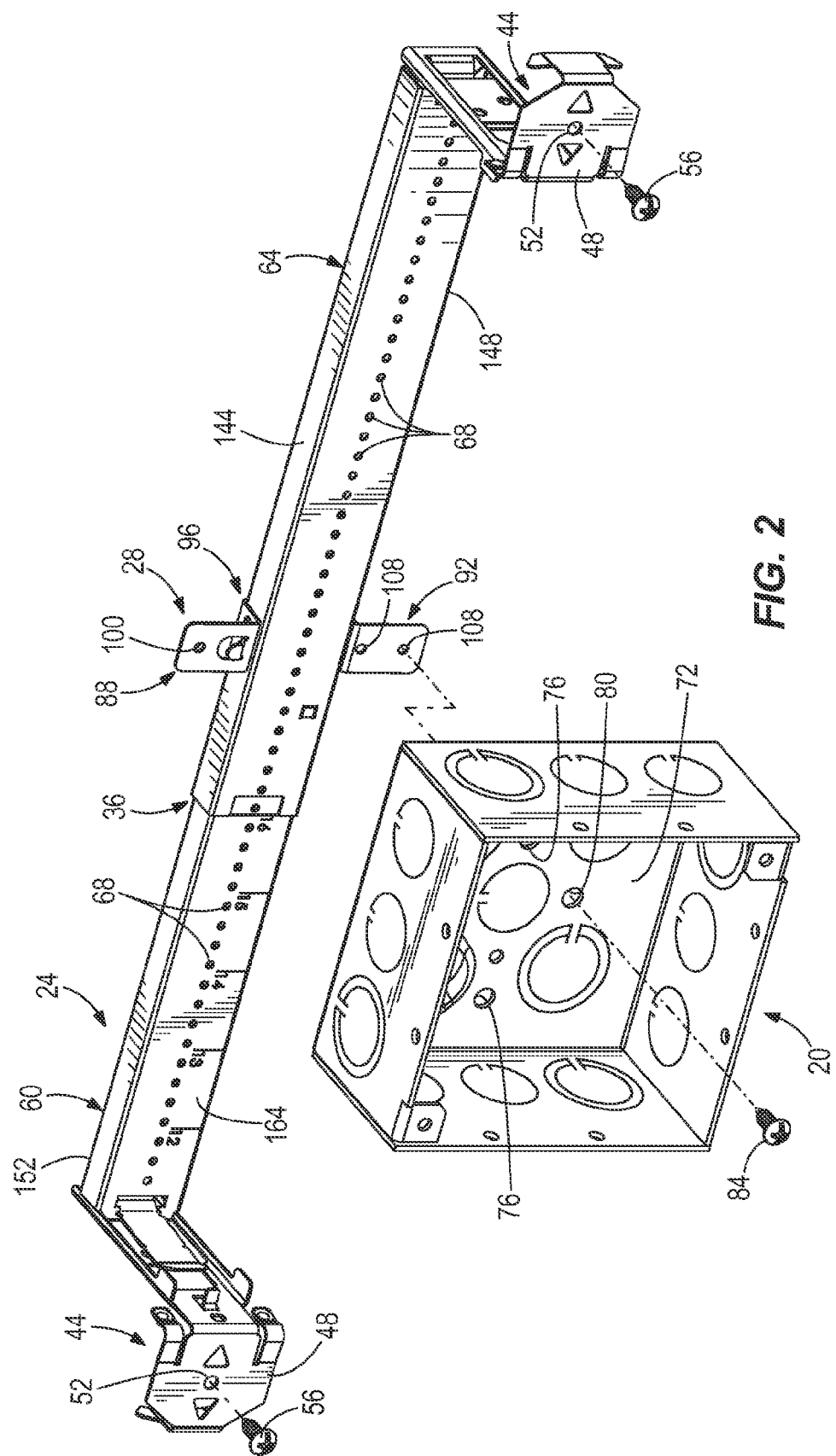
FIG. 2 a top, front isometric view showing the electrical junction box of FIG. 1 exploded from the clip and the telescoping support member of FIG. 1, in accordance with one embodiment.
Figures 3, 4:
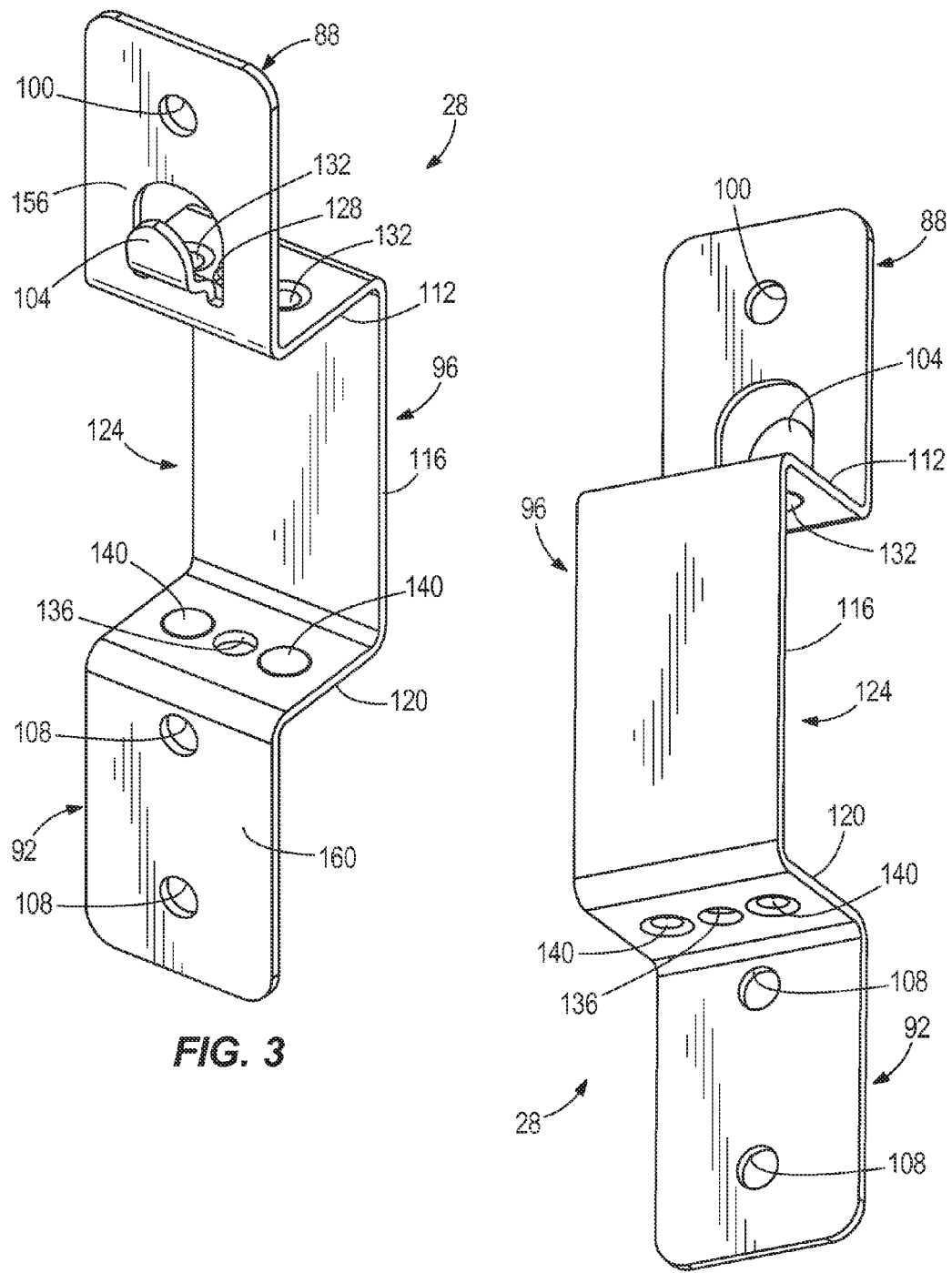
FIG. 3 is a top, front isometric view of the clip shown in FIG. 1, in accordance with one embodiment.
FIG. 4 is a bottom, rear isometric view of the clip shown in FIG. 3, in accordance with one embodiment.

Referring now to FIGS. 1 and 2, an exemplary device, electrical box or electrical junction box 20 is coupled to an exemplary horizontal support member 24 with an exemplary clip 28 (see FIG. 2). The support member 24 is coupled to and between vertical structural members 32 such as, for example, wall studs used in constructing houses, buildings, etc. The illustrated exemplary support member 24 is of the type generally referred to as an adjustable mounting bar or a telescoping bar. The horizontal support member 24 includes a generally elongate mounting section 36 defining a channel 40 therein, and a pair of coupling members 44 at opposite ends of the mounting section 36.

Each coupling member 44 includes a flange 48 that extends around a portion of a vertical structural member 32 and resiliently couples the coupling member 44 to the vertical structural member 32. When both coupling members 44 are coupled to their respective vertical structural member 32, the mounting section 36 of the support member 24 extends generally horizontally between the vertical structural members 32. If desired, each flange 48 includes one or more apertures 52 through which fasteners 56 may be inserted to fasten the flanges 48 to the vertical structural members 32, thereby providing additional coupling support between the coupling members 44 and the vertical structural members 32.

The mounting section 36 of the support member 24 includes a first member 60 and a second member 64 with the first member 60 positioned within or nested within the second member 64. Moreover, the second member 64 surrounds a portion of the first member 60 in such a manner that the first and second members 60, 64 may translate relative to each other along a longitudinal axis, but movement in other directions is restricted due to engagement between the first and second members 60, 64. The mounting section 36 defines a series of aligned box fastening openings 68 extending along the length thereof. A rear wall 72 of the electrical box 20 defines a pair of spaced-apart openings 76 (see FIG. 2) horizontally offset from a center of the box 20. The electrical box 20 also defines a pair of openings 80 (see FIG. 2) vertically offset from the center of the box 20. Use of suitable fasteners 84 in conjunction with the openings 76, 80 to couple the box 20 to the support member 24 is desired. It is understood that the illustrated electrical box 20 is empty and that to complete the installation, an electrical device such as, for example, an electrical outlet, switch, etc., may be placed in the box 20 and wired.

With continued reference to FIGS. 1 and 2, and with further reference to FIGS. 3-7, the exemplary clip 28 is illustrated for coupling the electrical box 20 to the support member 24. The clip 28 may be made of a variety of different materials, all of which are intended to be within the spirit and scope of the present disclosure. In some exemplary embodiments, the clip 28 may be made of plain carbon steel. In other exemplary embodiments, the clip 28 may be made of heat treated high carbon steel, plain carbon steel with galvanized or other corrosion resistant finish, other non-ferrous metals and non-metallic polymers, etc. In the illustrated exemplary embodiment, the clip 28 is also a one-piece unitarily formed component. Alternatively, the clip may be manufactured in multiple pieces and subsequently coupled together in any manner.

The clip 28 includes an upper flange 88, a lower flange 92, and a coupling member 96. The upper and lower flanges 88, 92 are generally vertically orientated and respectively extend upward and downward from the coupling member 96. The upper flange 88 defines a fastening opening 100 there through adapted to receive a suitable fastener and includes a projection 104 extending forward and upward from the upper flange 88. The fastening opening 100 is positioned above the projection 104. The lower flange 92 defines a pair of fastening openings 108 adapted to receive suitable fasteners. In the illustrated exemplary embodiment, the upper flange 88 includes a single fastening aperture 100 and the lower flange 92 includes two fastening apertures 108. It should be understood that the upper and lower flanges 88, 92 may include any number of fastening apertures 100, 108, including zero, and still be within the intended spirit and scope of the present disclosure.

The coupling member 96 is generally "C" shaped and includes a top member 112, a rear member 116, and a bottom member 120 together forming a receptacle 124 in the coupling member 96. The top and bottom members 112, 120 are generally horizontal and the rear member 116 is generally vertical and parallel to the upper and lower flanges 88, 92. The top member 112 defines a fastening aperture 128 there through and includes a pair of dimples or projections 132 extending into the receptacle 124 with the fastening aperture 128 positioned between the projections 132. Similarly, the bottom member 120 defines a fastening aperture 136 there through and includes a pair of dimples or projections 140 extending into the receptacle 124 with the fastening aperture 136 positioned between the projections 140. In the illustrated exemplary embodiment, the projections 132, 140 in the top and bottom members 112, 120 are semi-spherical, rounded, or curved in shape. Alternatively, the projections 132, 140 may have other shapes as long as the projections 132, 140 at least partially extend into the receptacle 124.

The receptacle 124 is appropriately shaped and sized to receive the mounting section 36 therein and resiliently engage and retain the mounting section 36 to couple the clip 28 to the support member 24. The receptacle 124 is also adapted to resiliently engage and retain either the first member 60 or the second member 64 of the mounting section 36 depending on where the clip 28 is coupled to the mounting section 36. When the clip 28 is coupled to the mounting section 36, the projections 132 on the top member 112 engage a top surface 144 of the mounting section 36 and the projections 140 on the bottom member 120 engage a bottom surface 148 of the mounting section 36. The projections 132, 140 provide additional engagement between the clip 28 and the mounting section 36, thereby increasing the amount of friction between the clip 28 and the mounting section 36 to ultimately provide greater resistance to the clip 28 falling from, being removed from, or otherwise disengaging the mounting section 36. It is desirable that the clip 28 remain in place when it is coupled to the mounting section 36. Only with an adequate quantity of force to the clip 28 or the electrical box 20 coupled to the clip 28 should the clip 28 move along or be removed from the mounting section 36.

The clip 28 has a relatively small width, height, depth, and thickness, thereby requiring very little material to manufacture the clip 28 compared to conventional clips or brackets used to couple electrical junction boxes to horizontal support members extending between and coupled to vertical structural members. This small amount of required material also provides a cheaper and reasonably priced clip 28 compared to the relatively expensive conventional clips. Moreover, the clip 28 is manufactured by making a few punches, a few indentations in the clip 28, and a few bends, thereby resulting in easy and inexpensive manufacturing of the clips 28.

Assembly of an electrical junction box 20 to a horizontal support member 24 will be described herein in more detail. While the steps of assembly included herein are described in an order, such order of steps is not intended to be limiting upon the present disclosure. Rather, the assembly steps may occur in a variety of different orders other than that described herein, may include additional steps or may include other steps, and all such possibilities are intended to be within the spirit and scope of the present disclosure.

The horizontal support member 24 is coupled at one end to a vertical structural member 32 with the coupling member 44 at that respective end. One or more fasteners 56 may be used to provide additional coupling of the coupling member 44 to the vertical structural member 32. The opposite end of the support member 24 is pulled away from the coupled end, which slides one of the first or second members 60, 64 out from and relative to the other of the first and second members 60, 64 (depending on which one of the first and second members is already coupled to the vertical structural member). The one of the first and second members 60, 64 is pulled out the appropriate amount to couple the other coupling member 44 to the other vertical structural member 32. The second coupling member 44 may also be fastened to provide additional coupling support. Alternatively, the mounting section 36 is telescoped or pulled apart the appropriate amount to align the coupling members 44 with the vertical structural members 32 and the coupling members 44 may be coupled to the vertical structural members 32 simultaneously or substantially simultaneously. The clip 28 is positioned behind the mounting section 36 and the receptacle 124 is aligned with the mounting section 36. The clip 28 is moved toward the rear of the mounting section 36 until the clip 28 engages the rear of the mounting section 36. As the clip 28 is pushed further toward and onto the rear of the mounting section 36, the resiliency of the clip 28 causes the top member 112 and the bottom member 120 to flex apart such that the mounting section 36 inserts into the receptacle 124. The clip 28 is moved further onto the mounting section 36 bringing the projections 132, 140 on the top and bottom members 112, 120 into contact respectively with the top and bottom surfaces 144, 148 of the mounting section 36. Engagement between the projections 132, 140 and the mounting section 36 flex the top and bottom members 112, 120 further apart, thereby providing a resistance force between the projections 132, 140 and the top and bottom surfaces 144, 148 of the mounting section 36. The clip 28 is moved onto the mounting section 36 until a rear surface 152 of the mounting section 36 engages the rear member 116 of the clip 28. At this point, front surfaces 156, 160 of the upper and lower flanges 88, 92 are generally co-planar with a front surface 164 of the mounting section 36. The clip 28 may be slid along the mounting section 36 to a desired location, all the while the clip 28 being coupled to the mounting section 36.

The electrical box 20 is positioned to a front of the mounting section 36 and aligned with the clip 28. The electrical box 20 includes an aperture therein aligned with the projection 104 on the clip 28 and, as the electrical box 20 moves toward the clip 28, the projection 104 inserts into the aperture defined in the electrical box 20. At this point, the electrical box 20 hangs on the projection 104 and the projection 104 may be sufficient to retain the electrical box 20 in position. Openings 80 in the rear wall 72 of the electrical box 20 are aligned with the fastening openings 100, 108 defined in the upper and lower flanges 88, 92 of the clip 28. The rear wall 72 of the electrical box 20 is not required to have an opening for each fastener opening defined in the upper and lower flanges 88, 92. Rather, the rear wall 72 of the electrical box 20 may have zero, one, or two openings defined therein that align with any of the fastening openings 100, 108 defined in the upper and lower flanges 88, 92. An appropriate number of fasteners insert into aligned openings to couple the electrical box 20 to the clip 28. The clip 28 may also be further coupled to the mounting section 36 such that the clip 28 and electrical box 20 cannot slide along the mounting section 36. Particularly, a fastener may be inserted into the fastening aperture 128, 136 in either the top or bottom member 112, 120 of the clip 28 and fastened to the mounting section 36. If additional securement is desired between the clip 28 and the mounting section 36, fasteners may be inserted into both of the fastening apertures 128, 136 defined in the top and bottom members 112, 120. Additional fasteners 84 may also be inserted into aligned pairs of openings 68, 76 in the rear wall 72 of the electrical box 20 and the box fastening openings 68 defined in the mounting section 36.

Figure 8:
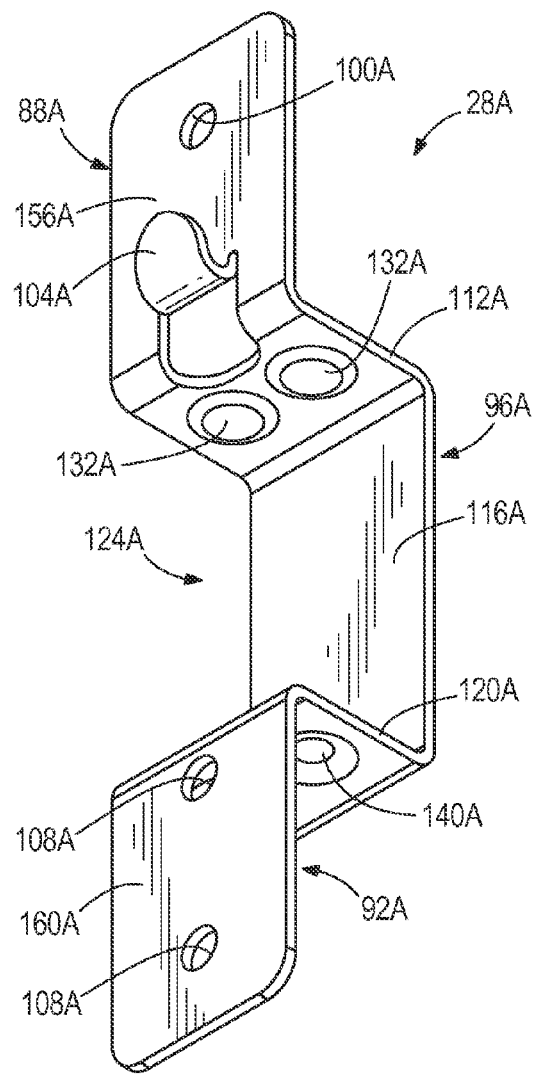
FIG. 8 is a bottom, front isometric view of another exemplary clip for supporting and coupling a device, such as an electrical junction box, to a support member, in accordance with one embodiment.

Referring now to FIG. 8, another exemplary clip 28A is shown that is adapted to couple a device, such as an electrical junction box, to a horizontal support member extending between and coupled to spaced-apart vertical structural members. Similar components between the clip 28A shown in FIG. 8 and the clip 28 shown in FIGS. 1-7 include the same reference number and an "A". Differences between the clip 28A illustrated in FIG. 8 and the clip 28 illustrated in FIGS. 1-7 will be described herein.

The clip 28A includes a projection 104A that extends forward and upward from the upper flange 88A of the clip 28A. An electrical junction box may be hung on the projection 104A while preparing fasteners for fastening the electrical junction box to the clip 28A. The clip 28A also includes larger projections 132A, 140A extending from the top member 112A and the bottom member 120A of the coupling member 96A. The projections 132A, 140A have a larger diameter and extend further into the receptacle 124A. The clip 28A also does not include fastening apertures in the top and bottom members 112A, 120A. By having the projections 132A, 140A extend further into the receptacle 124A, additional resistance is created between the clip 28A and the mounting section, thereby requiring a larger force to move the clip 28A along the mounting section or to remove the clip 28A from the mounting section.

Figure 9:
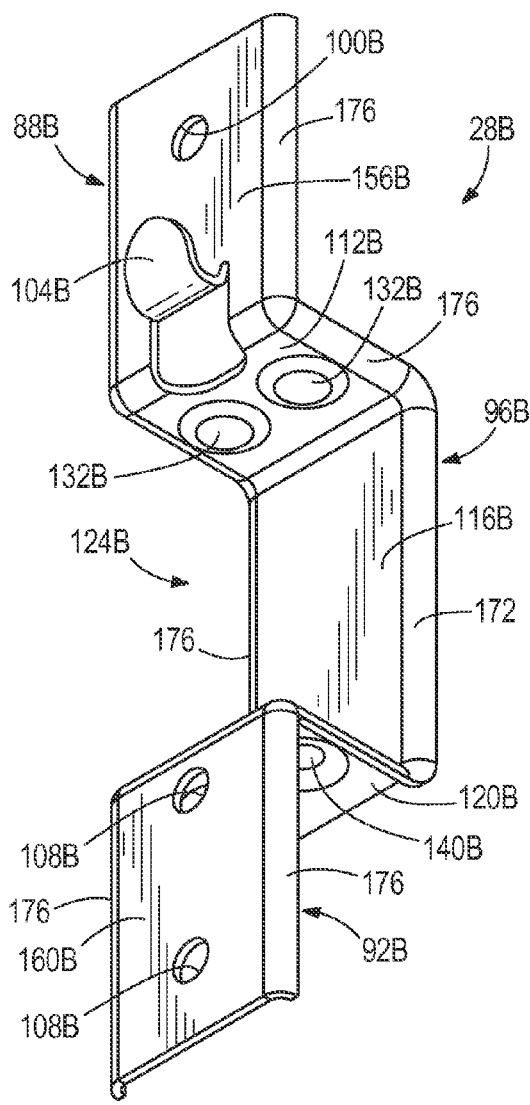
FIG. 9 is a bottom, front isometric view of a further clip for supporting and coupling a device, such as an electrical junction box, to a support member, in accordance with one embodiment.

Referring now to FIG. 9, a further exemplary clip 28B is shown that is adapted to couple a device, such as an electrical junction box, to a horizontal support member extending between and coupled to spaced-apart vertical structural members. Similar components between the clip 28B shown in FIG. 9 and the clips shown in FIGS. 1-8 include the same reference number and a "B". Differences between the clip 28B illustrated in FIG. 9 and the clips illustrated in FIGS. 1-8 will be described herein.

The clip 28B includes curved, bent, or rolled over edges 176, which provide additional stiffness to the clip 28B. These rolled over edges 176 may be incorporated to provide additional stiffness to clips or the additional stiffness provides the ability to use a thinner clip and have the same functionality and strength of a thicker clip without rolled over edges.

Figure 10:
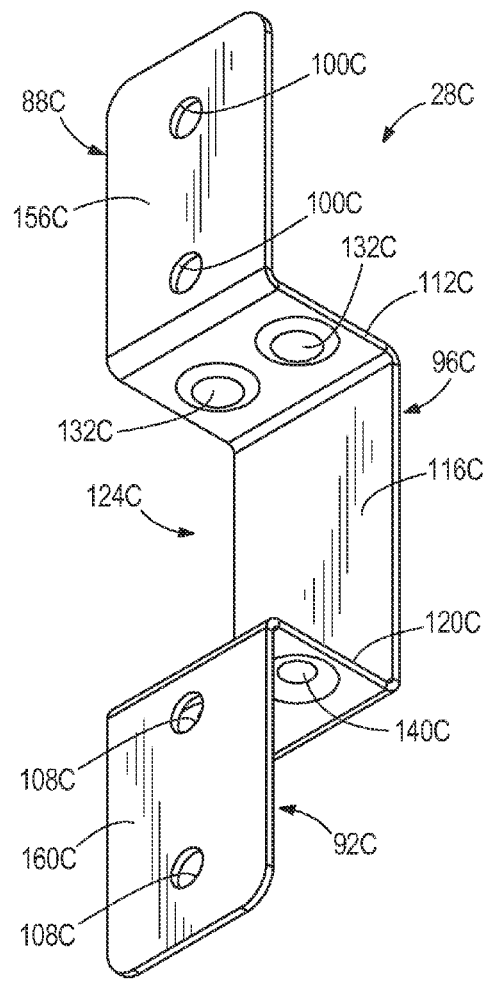
FIG. 10 is a bottom, front isometric view of yet another exemplary clip for supporting and coupling a device, such as an electrical junction box, to a support member, in accordance with one embodiment.

Referring now to FIG. 10, yet another exemplary clip 28C is shown that is adapted to couple a device, such as an electrical junction box, to a horizontal support member extending between and coupled to spaced-apart vertical structural members. Similar components between the clip 28C shown in FIG. 10 and the clips shown in FIGS. 1-9 include the same reference number and a "C". Differences between the clip 28C illustrated in FIG. 10 and the clips illustrated in FIGS. 1-9 will be described herein.

The clip 28C illustrated in FIG. 10 does not include a projection extending forward of the upper flange 88C on which an electrical junction box may be hung. Instead, the clip 28C includes another fastening opening 100C positioned below the other fastening opening 100C included in prior embodiments of the clip. The elimination of the projection from this clip 28C eliminates the one or more manufacturing steps required to form the projection, thereby providing a simpler, quicker, and less expensive manufacturing process for the clip 28C.

Figure 11:
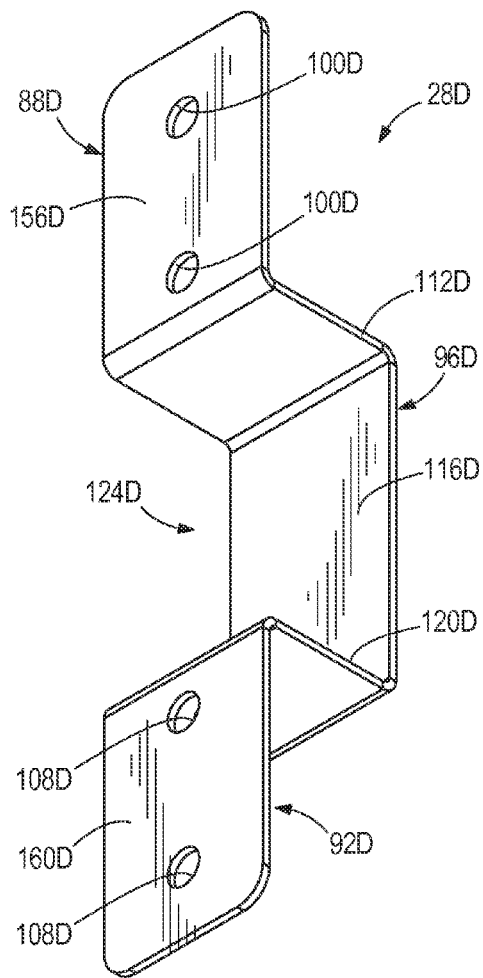
FIG. 11 is a bottom, front isometric view of yet a further exemplary clip for supporting and coupling a device, such as an electrical junction box, to a support member, in accordance with one embodiment.

Referring now to FIG. 11, yet a further exemplary clip 28D is shown that is adapted to couple a device, such as an electrical junction box, to a horizontal support member extending between and coupled to spaced-apart vertical structural members. Similar components between the clip 28D shown in FIG. 11 and the clips shown in FIGS. 1-10 include the same reference number and a "D". Differences between the clip 28D illustrated in FIG. 11 and the clips illustrated in FIGS. 1-10 will be described herein.

The clip 28D illustrated in FIG. 11 does not include the projection in the upper flange 88D similar to the clip 28C illustrated in FIG. 10. Moreover, the clip 28D illustrated in FIG. 11 does not include projections positioned on the top and bottom members 112D, 120D of the coupling member 96D of the clip 28D. In this exemplary embodiment, the clip 28D includes a receptacle 124D that is appropriately shaped and sized to receive the mounting section therein and resiliently engage and retain the mounting section to couple the clip 28D to the mounting section. The receptacle 124D is also adapted to resiliently engage and retain either the first member or the second member of the mounting section depending on where the clip 28D is positioned on the mounting section. When the clip 28D is coupled to the mounting section, the top member 112D engages the top surface of the mounting section and the bottom member 120D engages the bottom surface of the mounting section. It is desirable that the clip 28D remain in place when it is coupled to the mounting section. Only with an adequate quantity of force applied to the clip 28D or the electrical box coupled to the clip 28D should the clip 28D move along or be removed from the mounting section.

Referring now to FIG. 12, still another exemplary clip 28E is shown that is adapted to couple a device, such as an electrical junction box, to a horizontal support member extending between and coupled to spaced-apart vertical structural members. Similar components between the clip 28E shown in FIG. 12 and the clips shown in FIGS. 1-11 include the same reference number and an "E". Differences between the clip 28E illustrated in FIG. 12 and the clips illustrated in FIGS. 1-11 will be described herein.

The clip 28E illustrated in FIG. 12 does not include an upper flange extending upward from the coupling member 96E, but still includes a projection 104E. In this illustrated exemplary embodiment, the projection 104E extends forward and upward from the top member 112E of the coupling member 96E. An electrical box can be hung on the projection 104E during assembly of the electrical box to the clip 28E. The electrical box may additionally be coupled to the clip 28E by inserting fasteners through at least one of the fastener openings 108E in the lower flange 92E. Similar to some of the other clip embodiments, the clip 28E does not include projections on the top and bottom members 112E, 120E extending into the receptacle 124E. Thus, the clip 28E illustrated in FIG. 12 couples to the mounting section of the support member in a similar manner to the clip 28D illustrated in FIG. 11. That is, the coupling member 96E is appropriately sized and shaped to engage the mounting section of a support member with sufficient force and friction to couple the clip 28E to the mounting section.

Referring now to FIG. 13, still a further exemplary clip 28F is shown that is adapted to couple a device, such as an electrical junction box, to a horizontal support member extending between and coupled to spaced-apart vertical structural members. Similar components between the clip 28F shown in FIG. 13 and the clips shown in FIGS. 1-12 include the same reference number and an "F". Differences between the clip 28F illustrated in FIG. 13 and the clips illustrated in FIGS. 1-12 will be described herein.

The clip 28F illustrated in FIG. 13 does not include projections on interior surfaces of the top and bottom members 112F, 120F of the coupling member 96F extending into the receptacle 124F, but rather includes a pair of projections 180, 184 extending from respective edges of the top and bottom members 112F, 120F toward each other and toward a vertical center of the clip 28F. The top projections 180 extending from edges of the top member 112F extend below the top member 112F and the bottom projections 184 extending from edges of the bottom member 120F extend above the bottom member 120F. Each projection 180, 184 includes a first portion 188, 192 that extends from respective edges of the top member 112F or the bottom member 120F toward a vertical center of the clip 28F, a second portion or engagement portion 196, 200 at the end of the first portion 188, 192 for engaging the mounting section of the support member, and a third portion 204, 208 extending from the second portion 196, 200 away from the vertical center of the clip 28F. A distance is provided between vertically aligned engagement portions 196, 200 of the projections 180, 184 and this distance is less than a height of the mounting section. When the clip 28F is positioned on the mounting section, the engagement portions 196, 200 of the top and bottom projections 180, 184 respectively engage top and bottom surfaces of the mounting section and the top projections 180 deflect upward and the bottom projections 184 deflect downward. The top and bottom projections 180, 184 together resiliently engage and retain the mounting section to couple the clip 28F to the mounting section. The top and bottom projections 180, 184 are also adapted to resiliently engage and retain either the first member or the second member of the mounting section depending on where the clip 28F is coupled to the mounting section. By utilizing the top and bottom projections 180, 184 to resiliently engage and couple the clip 28F to the mounting section, rather than the top and bottom members 112F, 120F themselves as done in other clip embodiments, the upper and lower flanges 88F, 92F of the clip 28F will remain generally vertical and parallel to a front surface of the mounting section. That is, other clip embodiments utilizing the top and bottom members and projections on the top and bottom members extending into the receptacle to couple the clip to the mounting section may cause the upper and lower flanges to deflect to a position other than generally vertical. With the upper and lower flanges deflected to an angle displaced from vertical, the upper and lower flanges may not be parallel to a rear surface of the electrical box for coupling to the electrical box. The top and bottom projections 180, 184 illustrated in FIG. 13 ensure that the upper and lower flanges 88F, 92F are generally vertical and parallel to a rear surface of an electrical box.

Referring now to FIG. 14, another exemplary clip 28G is shown that is adapted to couple a device, such as an electrical junction box, to a horizontal support member extending between and coupled to spaced-apart vertical structural members. Similar components between the clip 28G shown in FIG. 14 and the clips shown in FIGS. 1-13 include the same reference number and a "G". Differences between the clip 28G illustrated in FIG. 14 and the clips illustrated in FIGS. 1-13 will be described herein.

The clip 28G illustrated in FIG. 14 does not include an upper flange and includes a cutout or recess 212 in the top member 112G. The cutout 212 facilitates the top member 112G being more flexible than top members of other clip embodiments and more flexible than the bottom member 120G of the clip 28G. The clip 28G also does not include projections on the top and bottom members 112G, 120G extending into the receptacle 124G. Thus, the clip 28G couples to the mounting section in a similar manner to the clip 28D illustrated in FIG. 11 with a difference being the cutout 212 in the top member 112G of the clip 28G. Sufficient resilience is established between the coupling member 96G of the clip 28G and the mounting section to couple the clip 28G to the mounting section. The clip 28G includes a lower flange 92G defining two fastening openings 108G there through for coupling an electrical box to the clip 28G.

Figure 15:
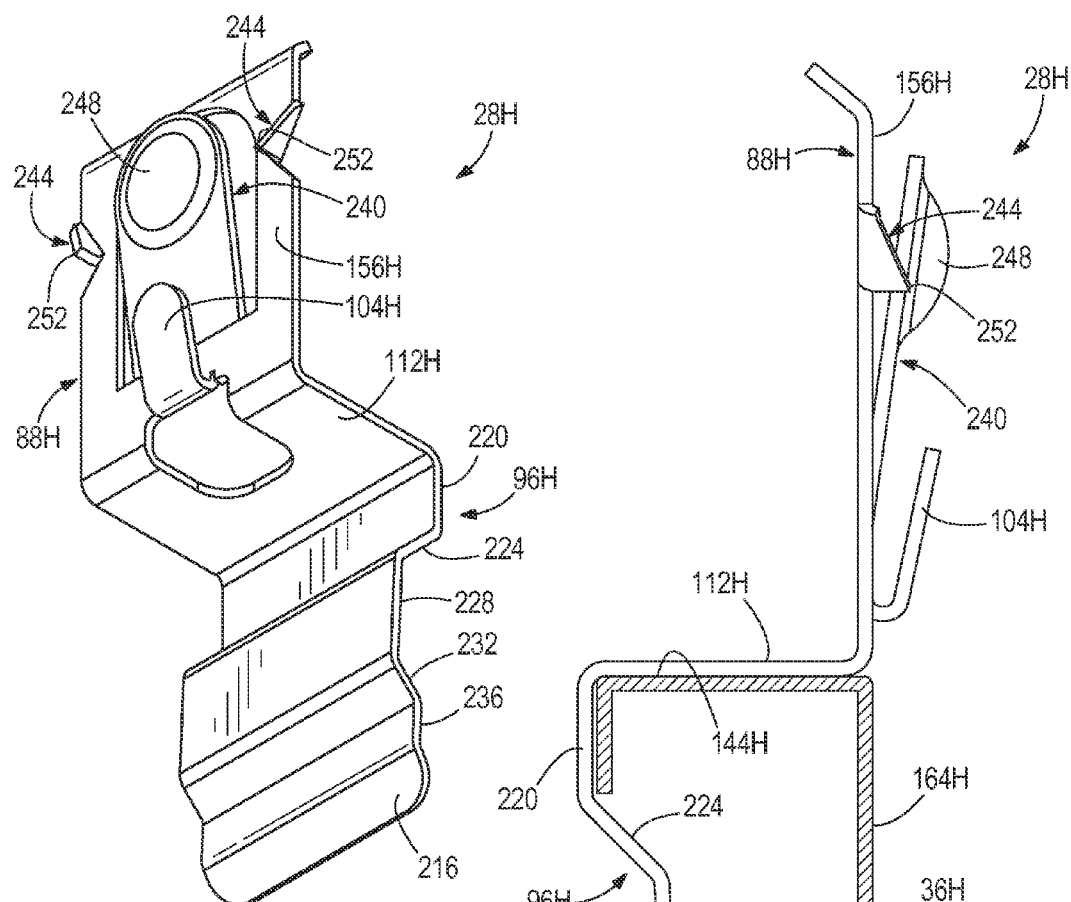
FIG. 15 is a bottom, front isometric view of a further exemplary clip for supporting and coupling a device, such as an electrical junction box, to a support member, in accordance with one embodiment.
Figure 16:
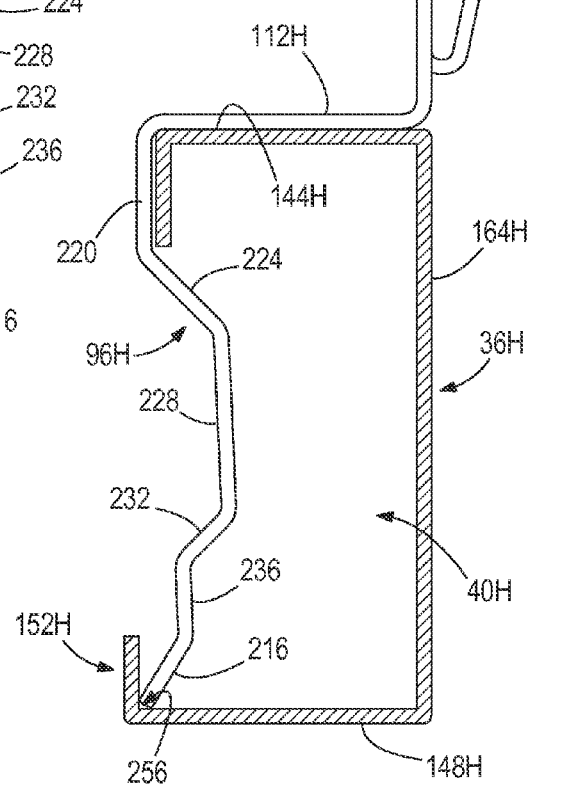
FIG. 16 is a right side view of the clip shown in FIG. 15 along with a cross-section of a support member similar to the support member shown in FIG. 1, in accordance with one embodiment.

Referring now to FIGS. 15 and 16, a further exemplary clip 28H is shown that is adapted to couple an electrical junction box to a horizontal support member extending between and coupled to spaced-apart vertical structural members. Similar components between the clip 28H shown in FIGS. 15 and 16 and the clips shown in FIGS. 1-14 include the same reference number and an "H". Differences between the clip 28H illustrated in FIGS. 15 and 16 and the clips illustrated in FIGS. 1-14 will be described herein.

The clip 28H illustrated in FIGS. 15 and 16 includes a coupling member 96H and an upper flange 88H. The coupling member 96H is adapted to couple to the mounting section 36H and includes a top member 112H, a lead-in end 216 and a plurality of surfaces that are appropriately shaped to wrap around a portion of the mounting section 36H and position a portion of the coupling member 96H within a channel 40H defined in the mounting section 36H. The top member 112H engages a top surface 144H of the mounting section 36H, a first surface 220 of the coupling member 96H extends downward from the top member 112H and is positioned behind the mounting section 36H, a second surface 224 extends downward and at an angle to the first surface 220 to position the second surface 224 in the channel 40H defined in the mounting section 36H, a third surface 228 extends downward from the second surface 224 and is also positioned in the channel 40H, a fourth surface 232 extends downward and rearward from the third surface 228 and is positioned in the channel 40H, a fifth surface 236 extends downward from the fourth surface 232 and is positioned in the channel 40H, and a sixth surface or lead-in end 216 of the coupling member 96H extends downward and rearward from the fifth surface 236 and is positioned in the channel 40H.

The upper flange 88H of the clip 28H is generally vertically orientated and includes a first projection 104H extending forward and upward from the upper flange 88H, a second projection 240 extending forward of the upper flange 88H, and a pair of third projections 244 extending forward from the upper flange 88H. The first projection 104H is adapted to insert into an opening in a rear wall of an electrical box to enable the electrical box to hang thereon during assembly or coupling of the electrical box to the clip 28H. The second projection 240 is resilient and flexible, and includes a semi-spherical or dome shaped member 248 adapted to engage a rear surface of the electrical box when the electrical box is hung on the first projection 104H. The resilient second projection 240 deflects when positioning the electrical box on the first projection 104H and, when deflected, applies a force or resistance to the rear surface of the electrical box. The pair of third projections 244 also engage the rear surface of the electrical box when the electrical box is hung on the first projection 104H. Each of the third projections 244 includes a sharp point 252 that is the portion of the third projection 244 engaging the rear surface of electrical box. The pair of third projections 244 limit the extent to which the electrical box will move rearward on the clip 28H. That is, when the electrical box is hung on the first projection 104H, the weight of the electrical box will cause the second projection 240 to begin to deflect rearward. The second projection 240 continues to deflect and the electrical box continues to move rearward until the rear surface of the electrical box engages the sharp points 252 of the third projections 244. Thus, the third projections 244 establish an at rest position for the electrical box when hung on the first projection 104H. The third projections 244 also inhibit rotation of the electrical box when coupled to the clip 28H.

To couple the clip 28H to the mounting section 36H, the lead-in 216 of the coupling member 96H is inserted into the channel 40H of the mounting section 36H from the rear of the mounting section 36H, the clip 28H is then rotated forward (clockwise as illustrated in FIG. 16) moving the lead-in 216 into a bottom rear corner 256 of the channel 40H and moving the second through fifth surfaces 224-236 into the channel 40H, rotation of the clip 28H also causes the top member 112H of the coupling member 96H to deflect upward to move above the top surface 144H of the mounting section 36H, and the clip 28H continues to rotate until the first surface 224 of the coupling member 96H engages a rear surface 152H of the mounting section 36H and the top member 112H is generally parallel to and engages the top surface 144H of the mounting section 36H. The clip 28H is configured to provide sufficient resilience between the coupling member 96H of the clip 28H and the mounting section 36H to couple the clip 28H to the mounting section 36H.

Figure 17:
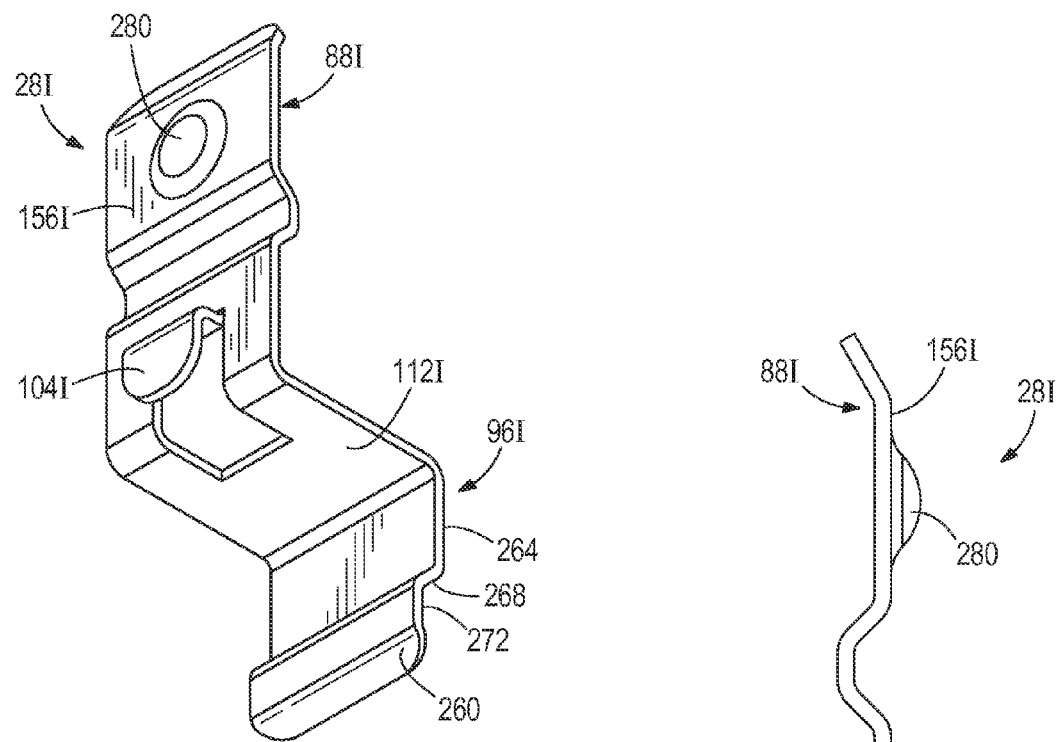
FIG. 17 is a bottom, front isometric view of still another exemplary clip for supporting and coupling a device, such as an electrical junction box, to a support member, in accordance with one embodiment.
Figure 18:
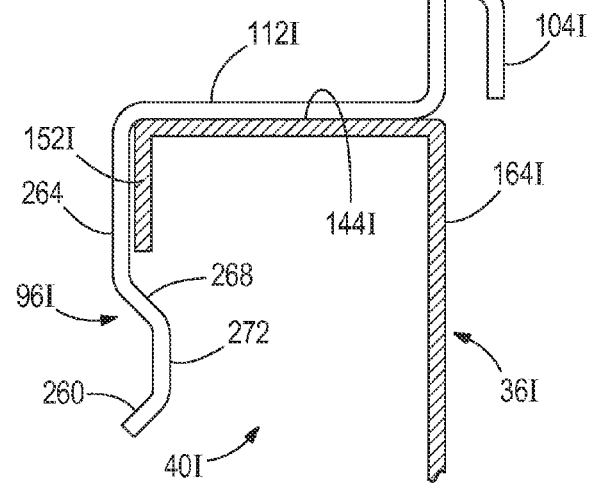
FIG. 18 is a right side view of the clip shown in FIG. 17 along with a cross-section of a portion of a support member similar to the support member shown in FIG. 1, in accordance with one embodiment.

Referring now to FIGS. 17 and 18, yet another exemplary clip 28I is shown that is adapted to couple a device, such as an electrical junction box, to a horizontal support member extending between and coupled to spaced-apart vertical structural members. Similar components between the clip 28I shown in FIGS. 17 and 18 and the clips shown in FIGS. 1-16 include the same reference number and an "I". Differences between the clip 28I illustrated in FIGS. 17 and 18 and the clips illustrated in FIGS. 1-16 will be described herein.

The clip 28I illustrated in FIGS. 17 and 18 includes a coupling member 96I and an upper flange 88I. The coupling member 96I is adapted to couple to the mounting section 36I and includes a top member 112I, a lead-in end 260 and a plurality of surfaces that are appropriately shaped to wrap around a portion of the mounting section 36I and position a portion of the coupling member 96I within a channel 40I defined in the mounting section 36I. The top member 112I engages a top surface 144I of the mounting section 36I, a first surface 264 of the coupling member 96I extends downward from the top member 112I and is positioned behind the mounting section 36I, a second surface 268 extends downward and at a forward angle to the first surface 264 to position the second surface 268 in the channel 40I defined in the mounting section 36I, a third surface 272 extends downward from the second surface 268 and is also positioned in the channel 40I, and a fourth surface or lead in 260 extends downward and rearward from the third surface 272 and is positioned partially in and partially out of the channel 40I. The first and second surfaces 264, 268 are adapted to pinch, clasp, or compress around a top rear flange of the mounting section 36I while the top member 112I of the coupling member 96I engages the top surface 144I of the mounting section 36I. This pinching, clasping, or compressing provides sufficient resistance between the clip 28I and the mounting section 36I to couple the clip 28I to the mounting section 36I.

The upper flange 88I of the clip 28I is generally vertical and includes a first projection 104I extending forward and downward from the upper flange 88I and a second projection 280 extending forward of the upper flange 88I. The first projection 104I is adapted to insert into an opening in a rear wall of an electrical box and the second projection 280 is generally semi-spherical or dome shaped and adapted to engage a rear surface of the electrical box. The upper flange 88I is resilient and deflects rearward when the rear surface of the electrical box engages the second projection 280. Sufficient resistance is applied to the rear surface of the electrical box by the deflected upper flange 88I and to a front surface of the electrical box by the first projection 104I to couple the electrical box to the clip 28I.

Figure 19:
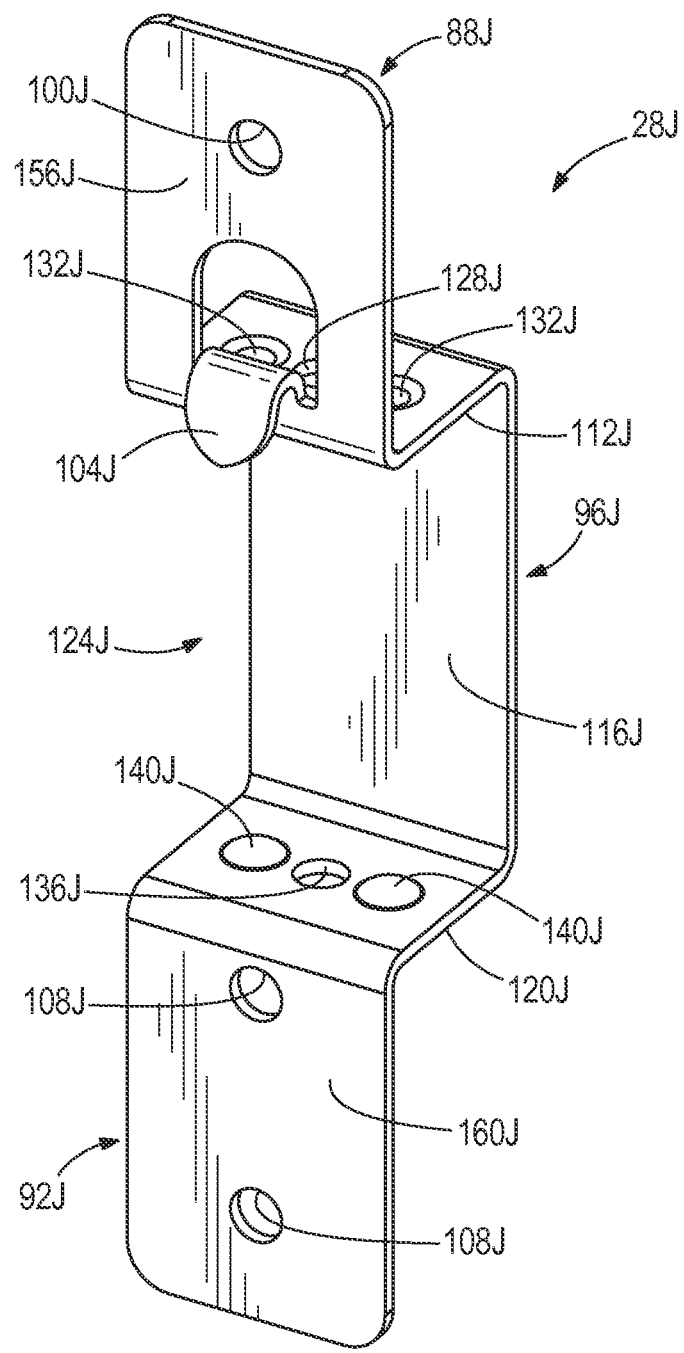
FIG. 19 is a top, front isometric view of still a further exemplary clip for supporting and coupling a device, such as an electrical junction box, to a support member, in accordance with one embodiment.

Referring now to FIG. 19, yet a further exemplary clip 28J is shown that is adapted to couple a device, such as an electrical junction box, to a horizontal support member extending between and coupled to spaced-apart vertical structural members. Similar components between the clip 28J shown in FIG. 19 and the clips shown in FIGS. 1-18 include the same reference number and a "J". Differences between the clip 28J illustrated in FIG. 19 and the clips illustrated in FIGS. 1-18 will be described herein.

The clip 28J is similar to the clip 28 illustrated in FIGS. 2-7 except the projection 104J of the clip 28J extends forward and downward from the upper flange 88J.

The variety of clip embodiments included herein provide an ability to couple multiple electrical junction boxes to a support member and also allow a support member to adjust its length while the clips and electrical boxes are coupled to the support member. Additionally, the clips allow the electrical junction boxes to be slid or moved along a support member as desired. Moreover, the narrow width of the clip allows multiple electrical junction boxes to couple to a support member and abut or be positioned adjacent each other on the support member.

A variety of different clip embodiments including a wide variety of features are disclosed herein and, while particular features may be grouped together and associated with particular clip embodiments, any of the features of any of the clip embodiments may be incorporated into any other clip embodiment in any variation or combination with other features, and all of such possibilities are intended to be within the spirit and scope of the present disclosure.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the clips disclosed herein may be utilized in any orientation and use of terms such as "top", "bottom", "front", "rear", "back", "side", etc., are utilized to correspond to the exemplary orientation of the clips illustrated in the drawings. The use of these terms in association with the clips is not intended to limit the clips to a single orientation or to limit the clips in any manner.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A clip for coupling a device to a support member, the clip comprising:
    a coupling member adapted to engage the support member and including a first member, a second member spaced-apart from the first member, and a third member extending between and engaging the first and second members, wherein the first, second and third members together define a receptacle adapted to receive the support member therein;
    a flange extending from the coupling member and defining a fastener opening therein adapted to receive a fastener for coupling the clip to the device; and
    a first projection and a second projection extending from the first member into the receptacle and a third projection and a fourth projection extending from the second member into the receptacle, wherein the first member defines a first aperture therein between the first projection and the second projection, and wherein the second member defines a second aperture therein between the third projection and the fourth projection;
    wherein the clip is included in a system, wherein the system further comprises the device and the support member, and wherein the device is an electrical junction box and the support member is a telescoping bar adapted to couple at each of its two ends to a vertical wall stud.

2. The clip of claim 1, wherein the clip is unitarily formed as one-piece.

3. The clip of claim 1, wherein the first member is substantially parallel to the second member and the third member is substantially perpendicular to both the first member and the second member.

4. The clip of claim 1, wherein the flange extends from and is substantially perpendicular to the second member, and wherein the flange is substantially parallel to the third member.

5. The clip of claim 1, wherein the fastener opening is a first fastener opening, the flange further defining a second fastener opening therein adapted to receive a fastener for coupling the clip to the device.

6. The clip of claim 1, wherein the flange is a first flange extending from the second member, the clip further comprising a second flange extending from the first member.

7. The clip of claim 6, wherein the first flange and the second flange are substantially co-planar and substantially parallel to the third member.

8. The clip of claim 6, wherein the second flange includes a projection adapted to insert into an opening defined in the device.

9. The clip of claim 6, wherein the fastener opening in the first flange is a first fastener opening, and wherein the second flange defines a second fastener opening defined therein adapted to receive a fastener for coupling the clip to the device.

10. The clip of claim 6, wherein the first flange includes a first surface and the second flange includes a second surface, wherein the first surface and the second surface are adapted to be generally co-planar with a surface of the support member with the clip coupled to the support member.

11. The clip of claim 1, wherein the flange includes a surface adapted to be generally co-planar with a surface of the support member with the clip coupled to the support member.

12. A clip for coupling a device to a support member, the clip comprising:
    a coupling member adapted to engage the support member and including a first member, a second member spaced-apart from the first member, and a third member extending between and engaging the first and second members, wherein the first, second and third members together define a receptacle adapted to receive the support member therein;
    a first flange extending from the coupling member and defining a fastener opening therein adapted to receive a fastener for coupling the clip to the device, wherein the first flange extends from the second member;
    a second flange extending from the first member, wherein the second flange includes a projection adapted to insert into an opening defined in the device, and wherein the projection extends forward and upward from the second flange; and
    a first projection and a second projection extending from the first member into the receptacle and a third projection and a fourth projection extending from the second member into the receptacle, wherein the first member defines a first aperture therein between the first projection and the second projection, and wherein the second member defines a second aperture therein between the third projection and the fourth projection;

wherein the clip is included in a system, wherein the system further comprises the device and the support member, and wherein the device is an electrical junction box and the support member is a telescoping bar adapted to couple at each of its two ends to a vertical wall stud.

13. The clip of claim 12, wherein the clip is unitarily formed as one-piece.

14. The clip of claim 12, wherein the first flange and the second flange are substantially co-planar and substantially parallel to the third member.

15. The clip of claim 12, wherein the second flange defines a second fastener opening therein adapted to receive a fastener for coupling the clip to the device.

16. The clip of claim 12, wherein the first flange includes a first surface and the second flange includes a second surface, wherein the first surface and the second surface are adapted to be generally co-planar with a surface of the support member with the clip coupled to the support member.

\* \* \* \* \*